United States Patent [19]

Sugiyama et al.

[11] Patent Number: 5,751,858
[45] Date of Patent: May 12, 1998

[54] MOVING PICTURE CODING APPARATUS

[75] Inventors: Mikio Sugiyama; Kaoru Endo, both of Tokyo, Japan

[73] Assignee: NEC Corporation, Tokyo, Japan

[21] Appl. No.: 673,359

[22] Filed: Jun. 28, 1996

[30] Foreign Application Priority Data

Jun. 30, 1995 [JP] Japan .................................. 7-165535

[51] Int. Cl.$^6$ ............................................. G06K 9/00
[52] U.S. Cl. .................................... 382/236; 382/276
[58] Field of Search .............................. 348/515, 390;
395/806, 114, 135, 139; 345/150, 153;
364/514 R; 382/232, 233, 234, 235, 236,
238, 239, 240, 244, 248, 251, 252, 253,
190, 274, 275, 276, 282, 298, 299, 300,
307, 308

[56] References Cited

U.S. PATENT DOCUMENTS 4,785,349  11/1988  Keith et al. .......................... 358/136
5,572,235  11/1996  Mical et al. ......................... 345/150
5,621,660   4/1997  Chaddha et al. .................. 364/514 R
5,642,171   6/1997  Baumgartner et al. ............. 348/515

FOREIGN PATENT DOCUMENTS 64-866 (A)    1/1989  Japan ............................. H04N 1/41
2-205982 (A)  8/1990  Japan ............................ G06F 15/66

Primary Examiner—Leo Boudreau
Assistant Examiner—Bijan Tadayon
Attorney, Agent, or Firm—Foley & Lardner

[57] ABSTRACT

Before dither-processed data are input to a compression processing section, dither-processed data of a previous frame and dither-processed data of a current frame are subjected to inter-frame differential processing in a differential processing section to form signal series having long white and black run length for the data input to the compression processing section, thereby enhancing the compressibility. A coding control section for performing coding processing beforehand sets a flag for determining whether each of the dither processing, the differential processing and the compression processing is performed. Each processing is performed on the basis of the flag information.

10 Claims, 13 Drawing Sheets

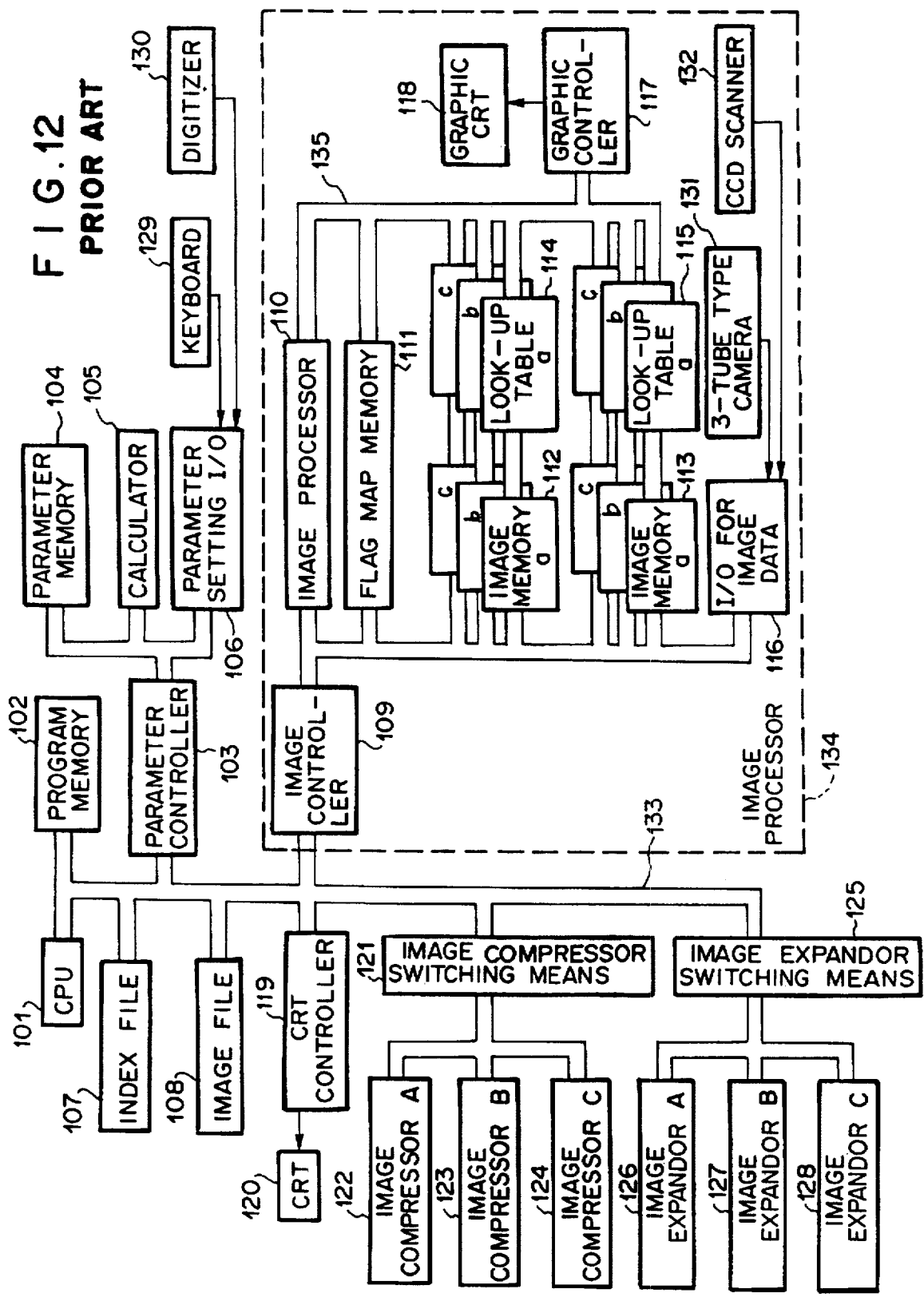

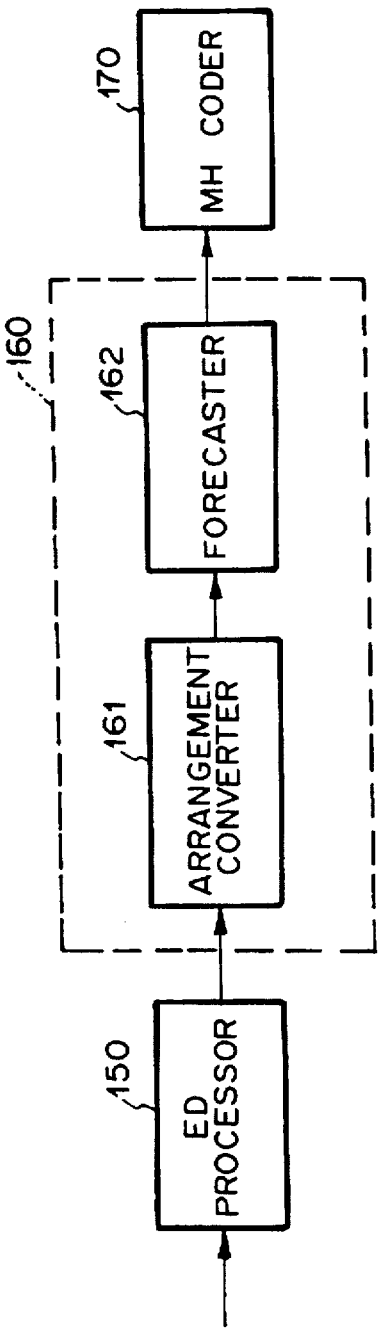
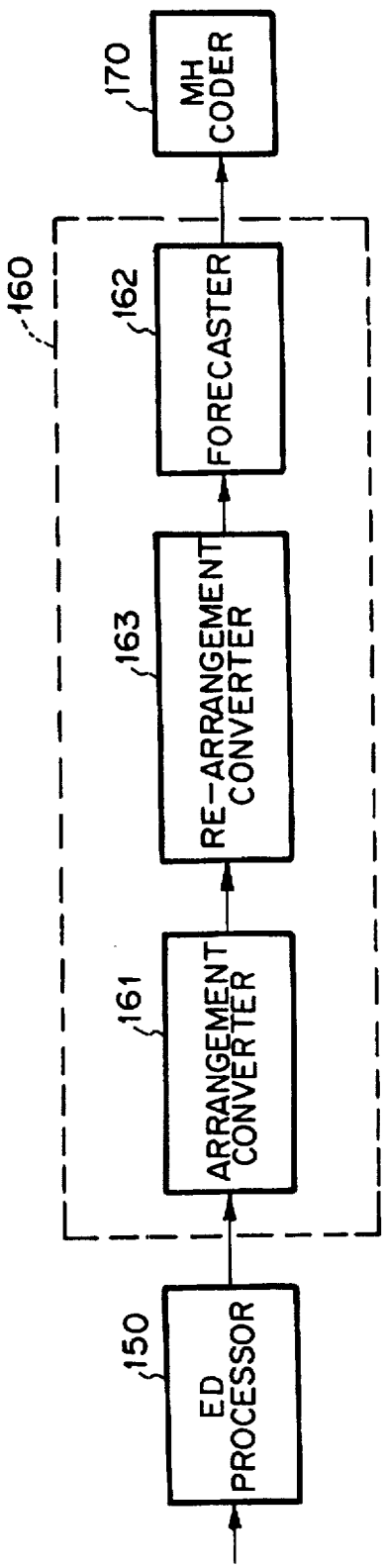

5,751,858

MOVING PICTURE CODING APPARATUS

BACKGROUND OF THE INVENTION

1. Field of the Invention

The present invention relates to an apparatus for storing the contents of information media such as books, newspapers, magazines, comic books, characters of animation, line drawings, photographs, cartoons, moving pictures, etc. on an electrical, optical or magnetic recording medium, and then reading out these contents from the recording medium and outputting the contents to a display device, and more particularly to a moving-picture data coding apparatus for these information media.

2. Description of Related Art

There is now being developed equipments in which data such as characters on books, newspapers and magazines, character data of line drawings, photographs, etc., and binary or multivalued image (picture) data are recorded on an electrical, optical or magnetic recording medium, and these data thus recorded are read out, developed into display images and then displayed on a display apparatus such as a liquid crystal display, a CRT display or the like. Particularly, in the case where the display apparatus is a liquid crystal display, the equipment is called as a portable terminal. An object of the development of these equipments is to prevent pulp resources from being exhausted by recording various information on recording media in place of sheets.

Multimedia have been recently developed, and this development of the multimedia promotes such a requirement that recording data which have been hitherto impossible to be printed on sheets are recorded on a recording medium. As this type of data are known binary or multivalued moving picture data which are called as simple moving pictures such as animation (hereinafter referred to as "simple moving picture data"). Accordingly, in some cases, character data, image data and simple moving picture data are required to be recorded while mixed with one another. In order to satisfy the above requirement, particularly when the recording capacity of a recording medium is small (for example, a floppy disc), or when there are a large amount of image data and simple moving picture data, data compression must be performed.

One of data compression methods for compressing plural kinds of image data is disclosed in Japanese Laid-open Patent Application No. Hei-2-205982. In this data compression method, a data compression algorithm of a data compression means is changed in accordance with an identification result of an identifying means to obtain optimum compression/expansion ratio at any time.

FIG. 12 is a block diagram showing the data compression method as disclosed in Japanese Laid-open Patent Application No. Hei-2-205982.

In FIG. 12, reference numeral 101 represents a control processor unit (CPU), and it controls the overall operation of the apparatus. Reference numeral 102 represents a program memory, and stores a control program to be executed by the CPU 101, etc. Reference numeral 103 represents a parameter controller, and controls the initialization, setting, comparison operation, etc. of various parameters needed for various processing under the control of the CPU 101. Reference numeral 104 represents a parameter memory, and stores various parameters. Reference numeral 105 represents a computing element, and performs the comparison and calculating operation, etc. of the various parameters. Reference numeral 106 represents a parameter setting I/O, and interfaces the parameter setting which is performed by an operator. Reference numerals 129 and 130 represent a keyboard and a digitizer respectively, and these elements register images and input commands such as a search demand, etc. and parameters through the parameter setting I/O 106. Reference numeral 120 represents a CRT, and displays a menu content, etc. when the parameters are set, for example. Reference numeral 119 represents a CRT controller, and controls the display operation of the CRT 120. Reference numeral 107 represents an index file, and an identification code, attribute data, etc. of an image which are used to register or search the image are recorded in the index file 107. Reference numeral 108 represents an image file, and the image data are recorded in the image file 108 in conformity to the identification code and the attribute data registered in the index file 107.

Reference numeral 122 represents an image compressor A, and it targets image data having a small number of colors like a sketch picture to obtain the maximum data compressibility by using a vector quantum method. Reference numeral 126 represents an image expander A, and it is paired with the image compressor A. The image expander A (126) serves to restore original image data with the algorithm which is opposite to that of the image compressor A (122). Reference numeral 123 represents an image compressor B, and it targets natural pictures such as photographs, etc. The image compressor B (123) is constructed by a prescribed image compression algorithm processing means. Reference numeral 127 represents an image expander B, and it is paired with the image compressor B (123). The image expander B serves to restore original image data with the algorithm which is opposite to that of the image compressor B (123). Reference numeral 124 represents an image compressor C, and it targets images such as characters, figures, etc. to obtain the maximum data compressibility by using a run-length method (which is varied in accordance with a threshold value). Reference numeral 128 represents an image expander C, and it is paired with the image compressor C (124). The image expander C (128) restores original image data with the algorithm which is opposite to that of the image compressor C (124). Reference numeral 121 represents image compressor switching means, and it selects one of the image compressor A (122), the image compressor B (123) and the image compressor C (124) under the control of the CPU 101. Reference numeral 125 represents image expander switching means, and it selects one of the image expander A (126), the image expander B (127) and the image expander C (128).

Reference numeral 134 represents an image processing unit, and it performs various processing other than the compression and expansion processing of the image data. In the image processing unit 134, reference numeral 110 represents an image processor, and it performs the central processing in the image processor 134. The image processor 110 is connected to the CPU 101 through an image controller 109 and a CPU bus 133, and receives image data from image memories 112 and 113 or through an image data I/O 116 in accordance with an instruction from the CPU 101 to perform various calculation and operation processing. The image processor 110 performs arithmetic calculation of four rules, logical calculation, maximum value/minimum value calculation, etc. between the respective planes 112a, 112b and 113c of the image memories 112 and 113 or between these planes and any constant. For example, the image processor 110 detects the maximum value and the minimum value between R, G and B data every pixel to calculate the difference therebetween, or convert R, G and B data into image data of another dimension (for example, H, L, S or y, I, Q coordinate system or the like). Each of the image memories 112 and 113 comprises frames (planes) a, b and c of three channels (for example, R, G, B or H, L, S or the like), and it is connected to both the CPU bus 133 and the video bus 135. Accordingly, the CPU 101 can read/write information from/in both the image memories 112 and 113, and the image processor 110 can calculate image data between any image memories.

Reference numeral 111 represents a flag map memory, and it stores flags, etc. generated through the results of various calculations on the image data of the image memories 112, 113 on the addresses corresponding to the image memories 112, 113. Reference numeral 114, and 115 represent a look-up table comprising a high-speed RAM, and its input is connected to the video bus 135 side of the image memories 112 and 113. Reference numeral 117 represents a graphic controller, and controls display of video data on the video bus 135. Reference numeral 118 represents a graphic CRT, and displays the video data output of the graphic controller 117. Reference numeral 116 represents an I/O for image data, and interfaces image data input from an image pickup device such as a 3-tube type camera 131 or a color CCD scanner 132.

Next, the operation of the apparatus thus constructed will be described hereunder.

When image data are registered, the original image data which are read in the image memory 112 or 113 are statistically analyzed to automatically select any one of the compressors 122 to 124 in conformity with the characteristics of an image. The code of the selected compressor is registered while contained in attribute data of the index file 107, and the data-compressed image data are written in the image file 108. Further, when the registered image data are searched, the code of the compressor is read out from the attribute data of the index file 107 to automatically select the corresponding image expander 126 and 128. With this operation, the original image data of the image file 108 are restored by the selected expander and displayed on a screen of CRT 120.

Japanese Laid-open Patent Application No. Sho-64-866 discloses a technique using another data compressor which is used when image signals containing binary and continuous gradation are coded. This technique relates to a data compression for facsimile or the like. The data compressor disclosed in this publication uses the dither processing of an error diffusion system (hereinafter referred to as "ED method"), and performs preprocessing to provide an affinity for an MH (Modified Huffman) coder serving as a coder before coding, whereby data near to random signals are set to data having long white and black run length to enhance the compressibility.

The embodiments of the technique disclosed in the above publication will be described with reference to the accompanying drawings.

FIG. 13 is a block diagram showing a first embodiment of the publication. As shown in FIG. 13, the first embodiment comprises an ED processor 150, a pre-processor 160 and an MH coder 170. The pre-processor 160 comprises an arrangement converter 161, and a forecaster (for example, a convolution circuit) 162.

In the first embodiment, binary image signals which are subjected to the error diffusion (ED) processing are subjected to pre-processing to provide an affinity for the MH coder 170 which is a coder of a facsimile before a coding process. In the preprocessing 160, signals having white or black run length are generated without reducing the performance of reproducibility of a half tone by the ED method. A forecast is made by the convolution circuit 162 which has been frequently used in the dither method, and then the MH coding is performed to reduce entropy. According to the first embodiment of this publication, the white or black run length becomes long, however, the randomness which have a small relativity on the time-series still remains. Therefore, this publication describes that sufficient compression is not expected as a whole in the first embodiment. In order to solve this problem, the publication provides a second embodiment.

FIG. 14 is a block diagram showing the second embodiment of the publication. As shown in FIG. 14, a re-arrangement converter 163 is added to the pre-processor 160. According to the second embodiment of the publication, the black or white pixels of ED-processed binary signal series having high randomness are first weighted and arranged without damaging the gradation in a sub matrix, and then image signals which are ranked as second and third in each matrix are weighted and arranged in an order of the black or white pixels in a master matrix comprising at least two sub matrixes. Thereafter, a forecast error is performed at the cycle corresponding to the matrix size of the master matrix to easily obtain time-series signals having small entropy.

Next, a conventional simple moving picture coding apparatus will be described with reference to the accompanying drawings.

FIG. 15 is a block diagram showing the construction of the simple moving picture coding apparatus. As shown in FIG. 15, the simple moving picture coding apparatus comprises an input device 210 such as a keyboard or the like, a coding control means 200 for controlling coding processing, a dither processing means 180 which is performed to prevent reduction in gradation of a display image of input simple moving picture data, and a compression processing means 190 for coding dither-processed data.

Next, the operation of the simple moving picture coding apparatus thus constructed will be described with reference to FIG. 16. The coded simple moving picture data are processed every frame.

The input device 210 supplies the coding control means 200 with the following coding conditions: an input file name, an output file name and whether the processing is performed, etc. The coding control means 200 initializes these coding conditions in step C1. In step C2, it is judged on the basis of the status of a dither flag whether the dither processing is performed. If the dither processing is judged to be performed, the dither processing is performed in the dither processing means 180 (step C3). In step C4, it is judged on the basis of the status of a compression flag whether the compression processing is performed. If the compression processing is judged to be performed, the compression processing is performed in the compression processing means 190 (step C5). In step C6, it is judged whether data to be coded are empty. If no data to be coded exist in a file, the coding is finished.

A first problem of the above conventional simple moving picture coding apparatus resides in that the size of the apparatus is large for the following reason. That is, as apparent from an embodiment of the compression device of the image data disclosed in Japanese Laid-open Patent Application No. Hei-2-205982, this apparatus uses plural kinds of compression methods to enhance the image data compression ratio, and thus the apparatus must be designed in a large scale.

A second problem of the above apparatus resides in that the compression is not efficiently performed when dither data are coded. This is because the dither-processed data are randomly distributed. In a data compressor disclosed in Japanese Laid-open Patent Application No. Sho-64-866, an MH coding system is used, and the dither data are preprocessed to provide an affinity for the MH coder before the dither data are coded, thereby solving the above problem. However, this technique is not effective for moving picture data.

A third problem of the above apparatus resides in that the moving picture data are not efficiently coded compared with still picture data. This is because like the second problem, the data obtained by coding the dither data are larger than the original dither data, and thus it is necessary to perform the coding again without performing the dither processing.

SUMMARY OF THE INVENTION

Therefore, an object of the present invention is to provide a moving picture coding apparatus in which simple moving picture data comprising plural image data can be efficiently coded in a simple construction without using a processor or hardware which is exclusively used for compression, and high compressibility can be obtained.

In order to attain the above object, a moving picture coding apparatus according to the present invention includes differential processing means for calculating the difference of dither-processed data between frames (30 in FIGS. 1 and 2) before coding the dither-processed data, data selection means for selecting the output data of each processing (20, 40 in FIGS. 1 and 2), and coding control means for beforehand determining a coding system and controlling the coding (60 in FIGS. 1 and 2).

The moving picture coding apparatus as described above may further include data storage means for storing compressed data (80 in FIG. 2), and data selection means for selecting the stored data and outputting the selected data (90 in FIG. 2).

The differential processing means performs an exclusive OR operation on previous frame data and current frame data to set data having randomness to data having long white or black run length.

The coding control means identifies and determines the coding system of the input simple moving picture data, and controls the data selection means and the coding processing. The data selection means selects the data which are processed by the determined coding system, and outputs the selected data. The data storage means performs the processing which is determined through the coding determination, and stores the compressed data.

The term "multivalued" in the claims may contain or may not contain "binary".

BRIEF DESCRIPTION OF THE DRAWINGS

FIG. 12 is a diagram showing the construction of a conventional image processing device;

FIG. 13 is a diagram showing the construction of a conventional data compressor;

FIG. 14 is a diagram showing the construction of a conventional data compressor;

DETAILED DESCRIPTION OF THE PREFERRED EMBODIMENTS

Preferred embodiments according to the present invention will be described with reference to the accompanying drawings.

Figure 1:
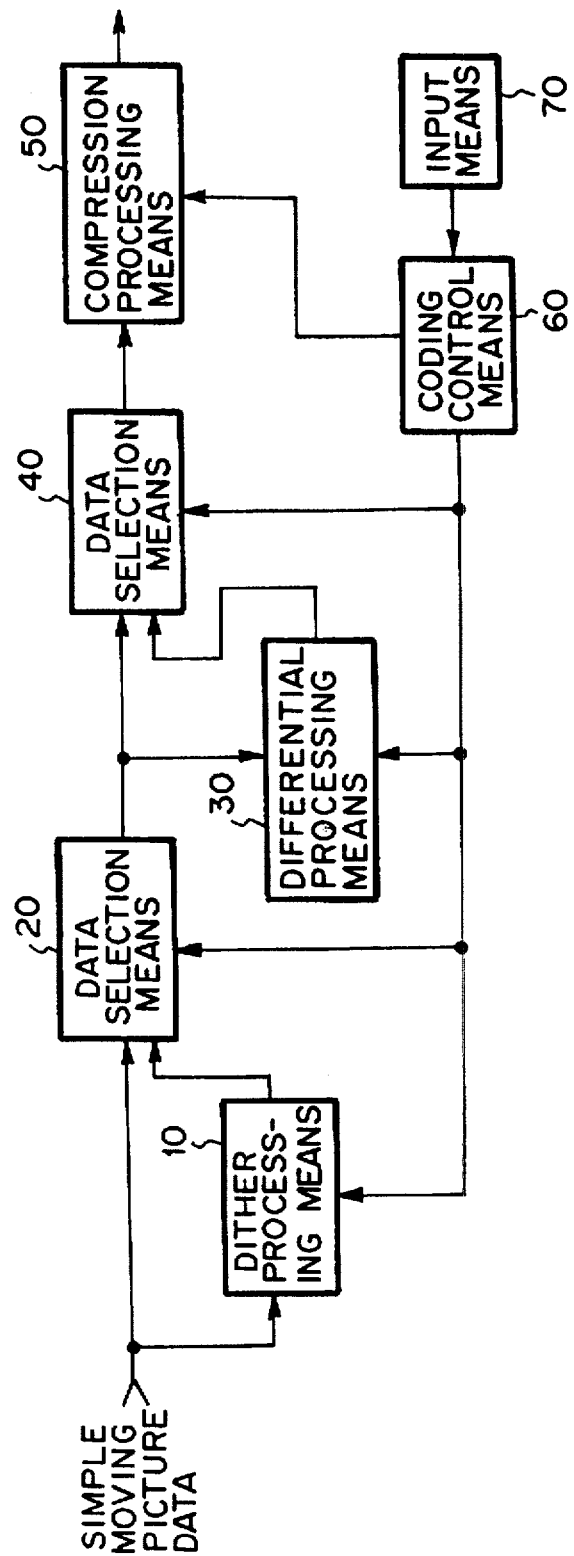
FIG. 1 is a block diagram showing the functional construction and the operation environment of a first embodiment of the present invention.

FIG. 1 is a block diagram of an embodiment of a simple moving picture coding apparatus according to the present invention.

As shown in FIG. 1, the simple moving picture coding apparatus of this embodiment includes dither processing means 10 for performing dither processing of simple moving picture data, data selection means 20 for selecting input simple moving picture data and data supplied from the dither processing means 10 and outputting the selected data, differential processing means 30 for performing differential processing on data supplied from the data selection means 20, data selection means 40 for selecting data supplied from the data selection means 20 and data supplied from the differential processing means 30 and outputting the selected data, compression processing means 50 for compressing the data supplied from the data selection means 40, input means 70 for inputting an instruction of a coding processing condition from a keyboard or the like and supplying the instruction to coding control means 60, and coding control means 60 for controlling each processing means 10, 30 and 50 and each data selection means 20, 40.

Figure 3:
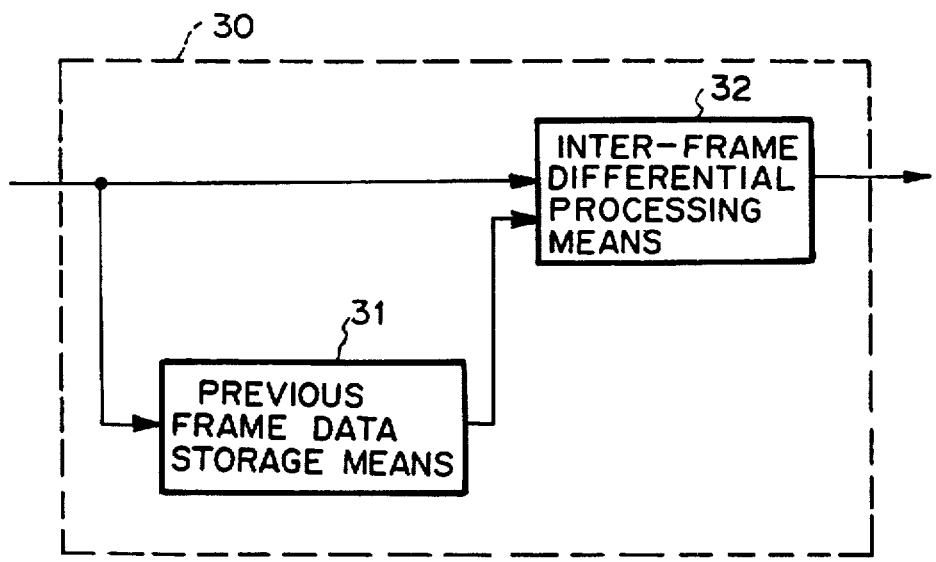
FIG. 3 is a block diagram showing the construction of differential processing means 30 of FIGS. 1 and 2.
Figure 4:
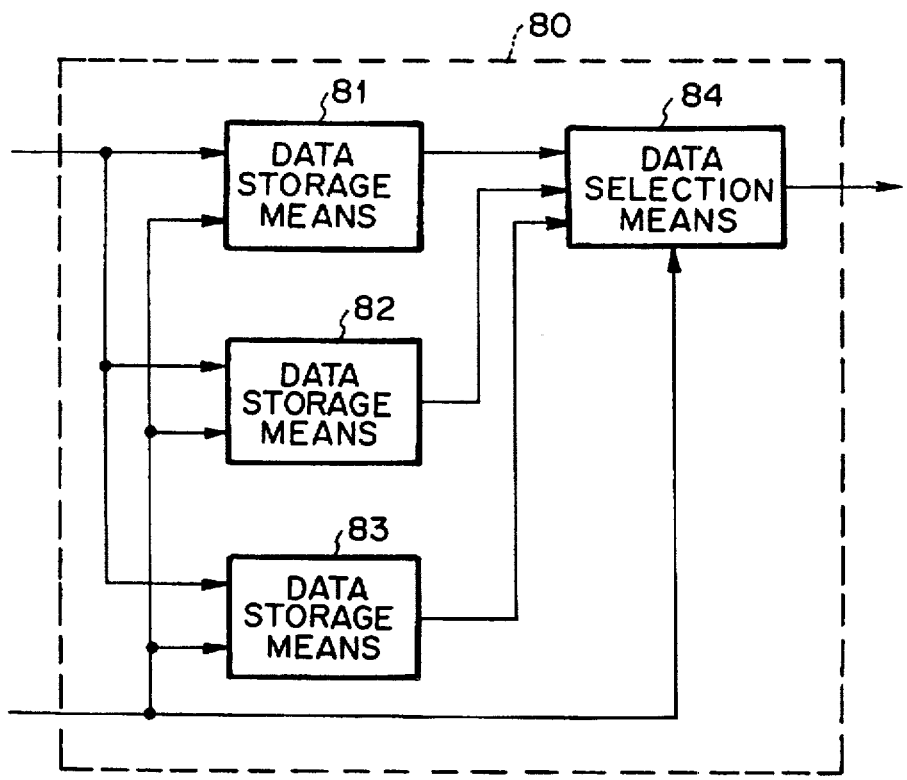
FIG. 4 is a block diagram showing the construction of compression data storage means 80 of FIG. 2.

As shown in FIG. 3, the differential processing means 30 includes previous frame data storage means 31 for storing data supplied from the data selection means 20, and interframe differential processing means 32 for performing an exclusive OR operation on previous frame data and current frame data at the same display position.

The dither processing means 10 uses a processing method using an error diffusion method, a systematic dither method or a random number generation dither method.

Since the data to be compressed by the compression processing means 50 have binary or multivalued gradation, the compression processing means 50 uses data compression of such a reversible coding system as MH (Modified Huffman) coding, MR (Modified Read) coding or MMR (Modified Modified Read) coding which are used for a facsimile machine or the like, and a slide dictionary type LZ (Lempel-Ziv) coding, or the like.

Figure 5:
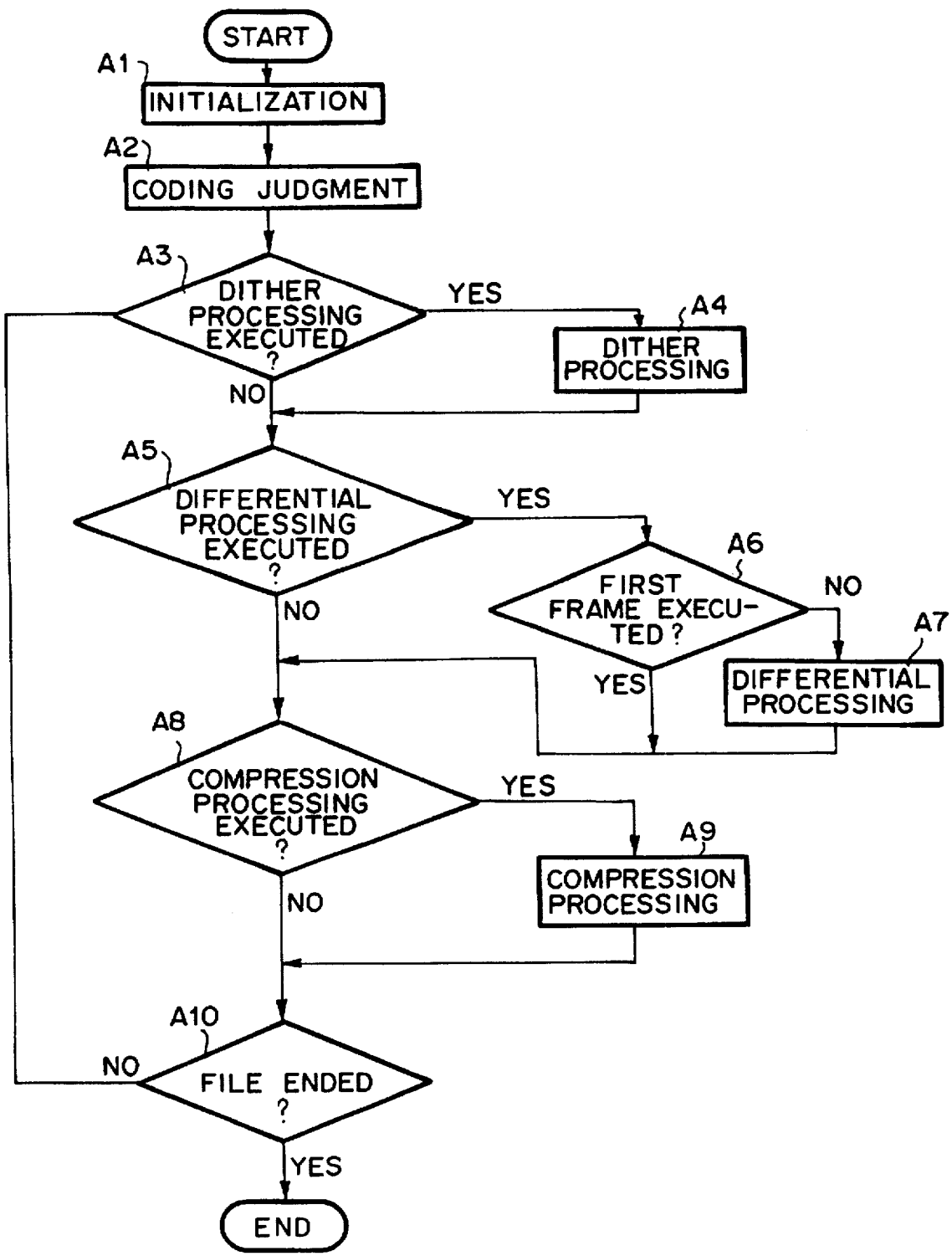
FIG. 5 is a flowchart showing the processing of the first and second embodiments of the present invention.

Next, the operation of the present invention will be described with reference to FIGS. 1 and 5.

The coding control means 60 is supplied with the coding conditions such as an input file name, an output file name, etc. of simple moving picture data which are binary or multivalued moving picture data and are input from the input device 70 to be coded, and the coding control means 60 initializes the coding conditions (step A1).

The coding control means 60 judges whether the input simple moving picture data can be compressed, and determines the processing method if the data compression is judged to be possible to set a coding condition flag (dither flag, differential flag, compression flag) (step A2). This flag has a binary value. If the value of the flag is "0", the processing is performed. If the value is "1", the processing is not performed.

In step A3, if the dither flag is "0", the dither processing is performed on the input simple moving picture data, and the processed data are output to the data selection means 20 (step A4). If the dither flag is "1", no dither processing is performed.

In step A5, the data supplied from the data selection means 20 are stored in the previous frame data storage means 31. If the differential flag is "0" and the data supplied from the data selection means 20 belongs to a frame other than a first frame, the inter-frame differential processing between the above data and the data stored in the previous frame data storage means 31 is performed in the differential processing means 32, and the processed data are output to the data selection means 40 (step A6, step A7).

In step A5, if the differential flag is "1" and the data supplied from the data selection means 20 belongs to the first frame, no differential processing is performed.

In step A8, if the compression flag is "0", the data supplied from the data selection means 40 are compressed and output (step 9). If the dither flag is "1", no compression processing is performed.

In step A10, it is judged whether any input simple moving picture data exist. This processing is repetitively performed until the data of the next frame are vanished. When the data of the next frame are vanished, the coding is finished.

Figure 6:
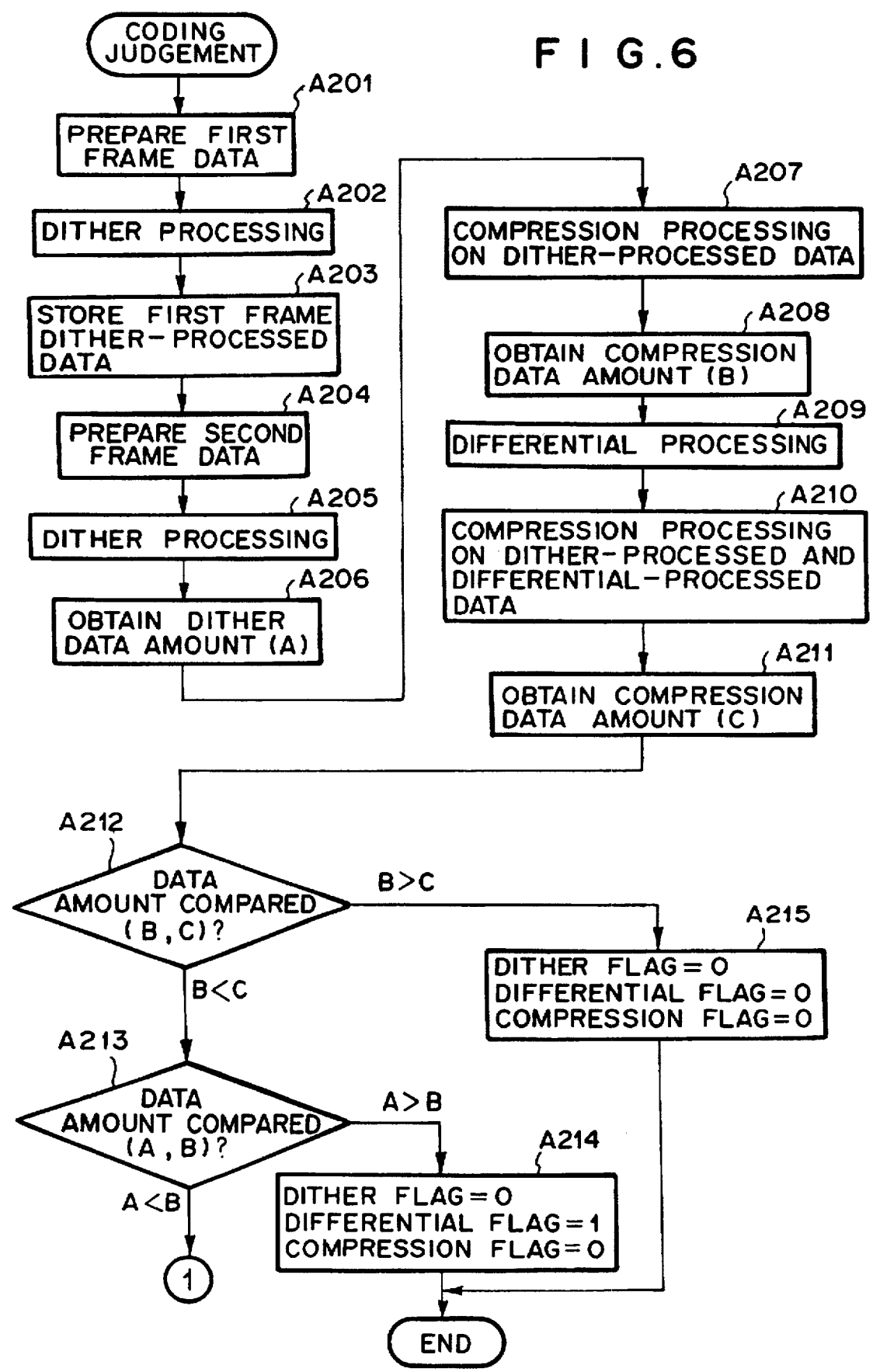
FIG. 6 is a flowchart showing a coding amount judgment (step S2) of the first embodiment according to the present invention.
Figure 7:
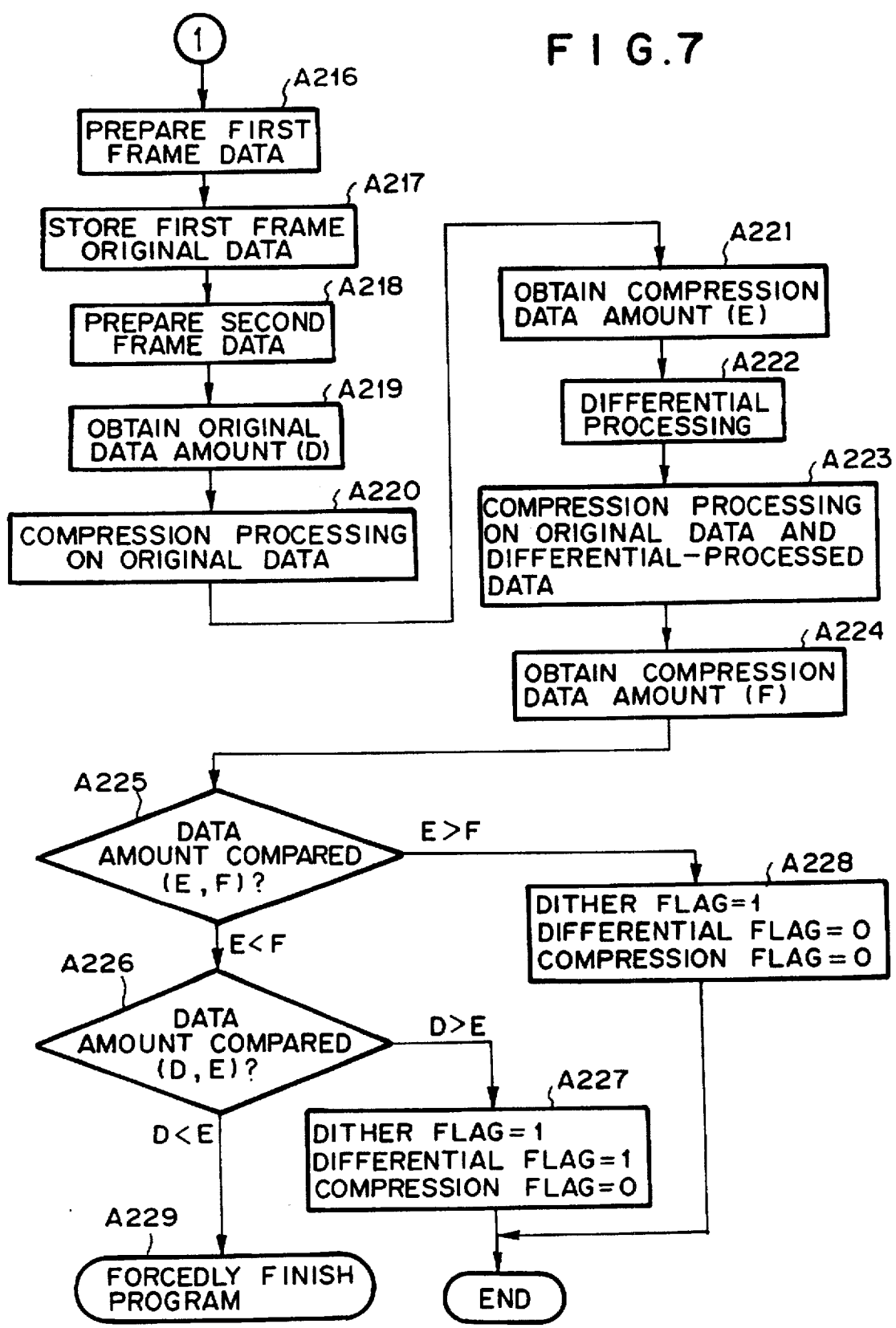
FIG. 7 is a flowchart showing the processing of the coding amount judgment of the first embodiment of the present invention.
Figure 8:
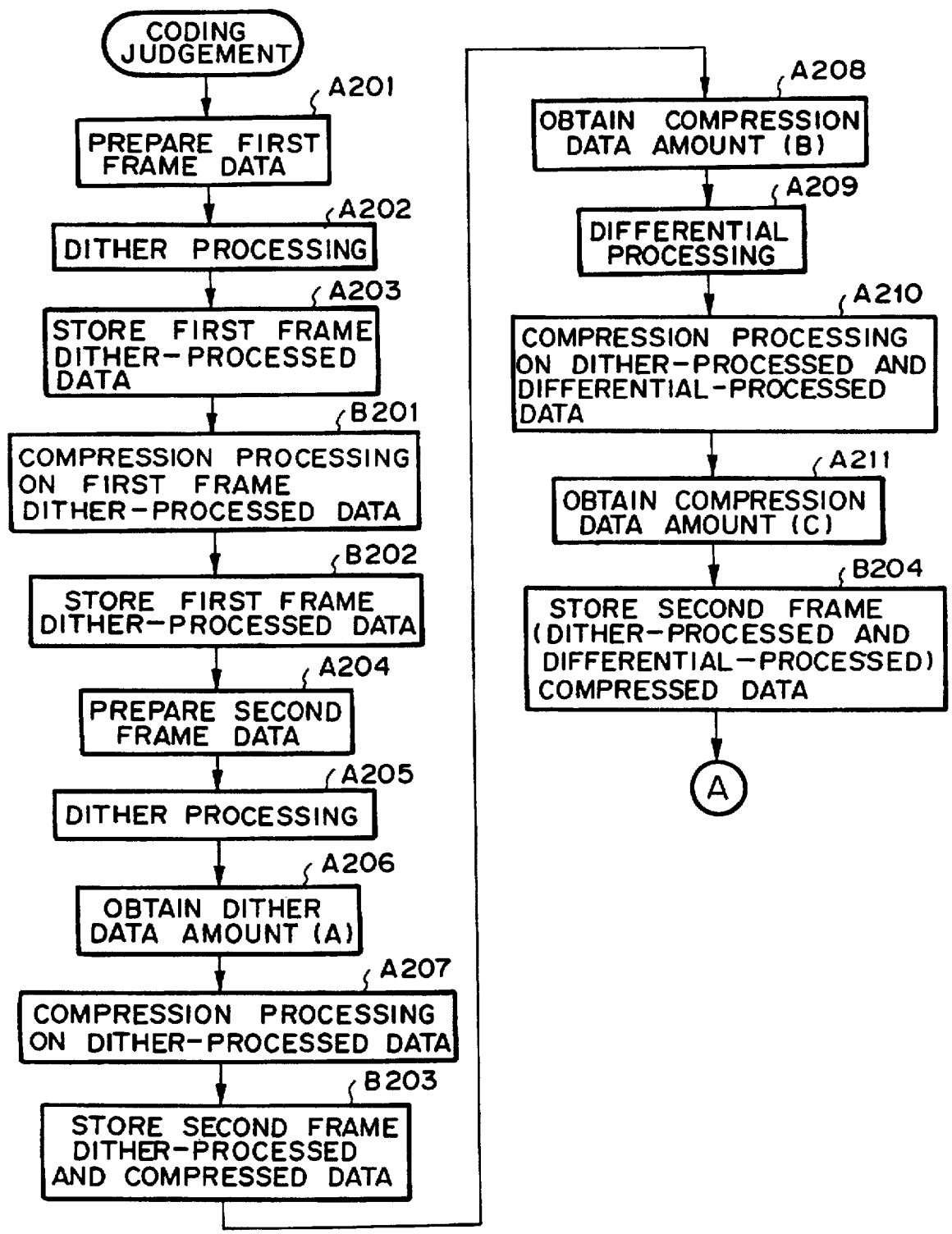
FIG. 8 is a flowchart showing the processing of the coding amount judgment (step A2) of the second embodiment of the present invention.
Figure 9:
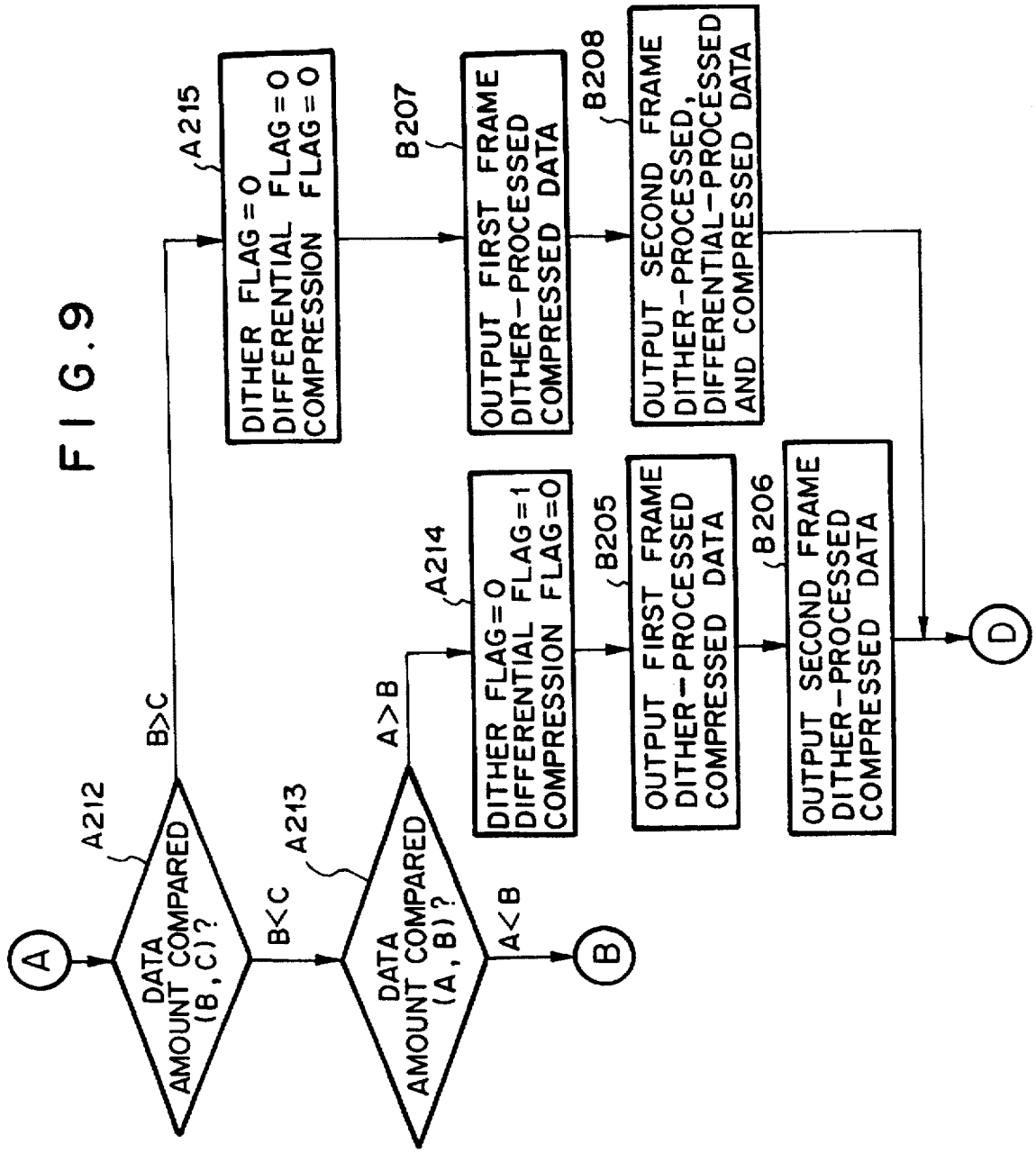
FIG. 9 is a flowchart showing the processing of the coding amount judgment of the second embodiment of the present invention.
Figure 10:
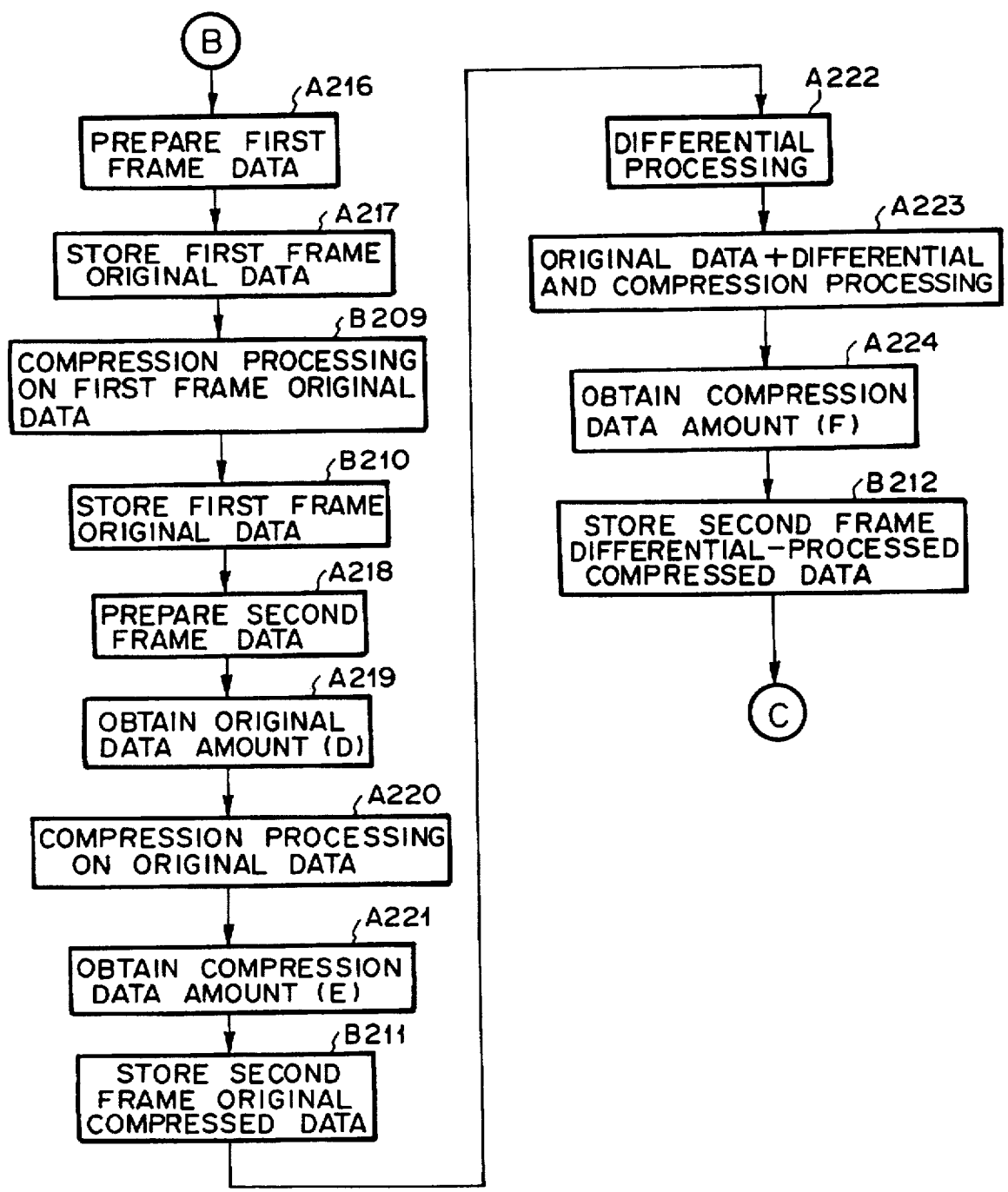
FIG. 10 is a flowchart showing the processing of the coding amount judgment of the second embodiment of the present invention.
Figure 11:
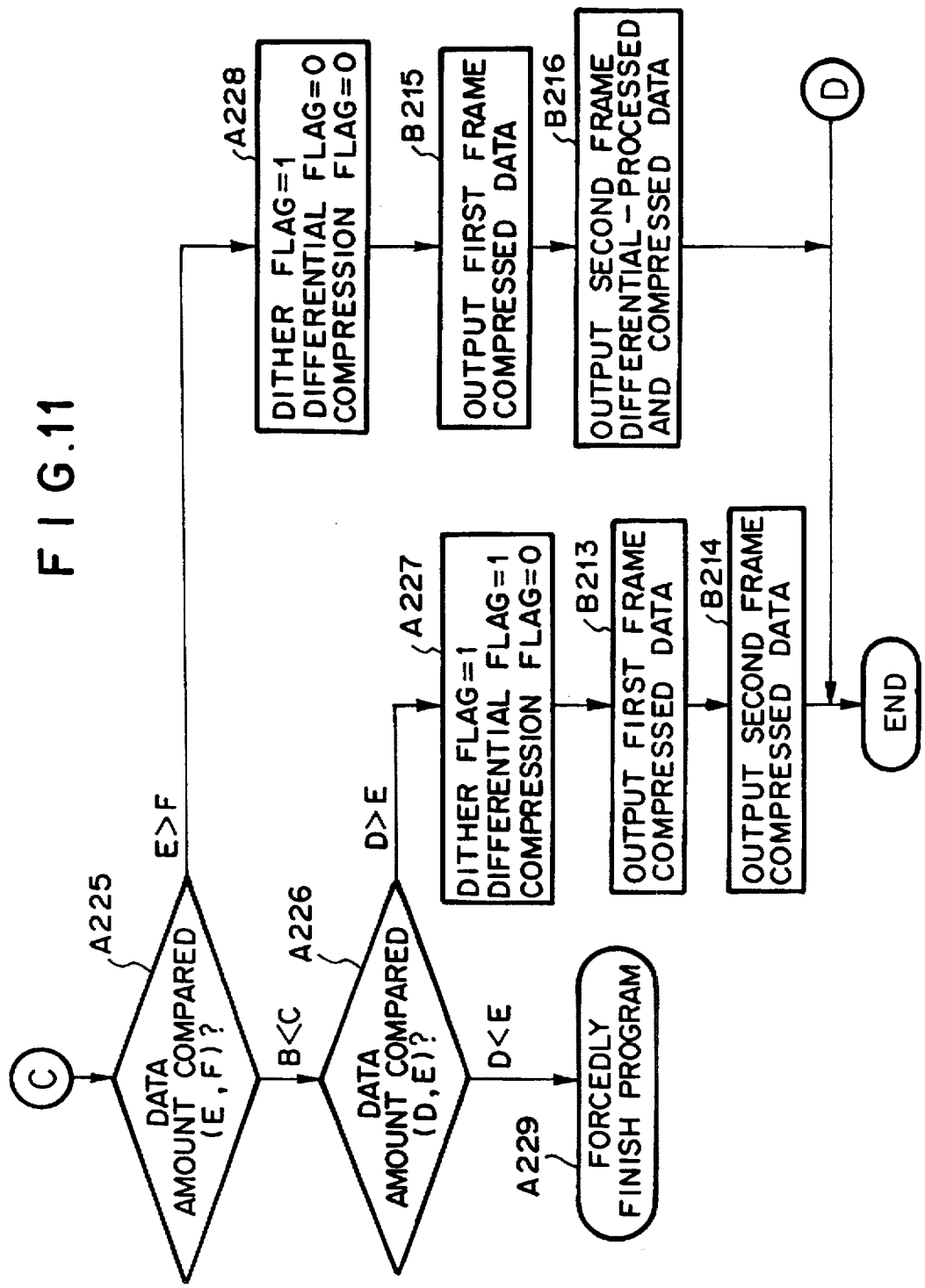
FIG. 11 is a flowchart showing the processing of the coding amount judgment of the second embodiment of the present invention.
Figure 15:
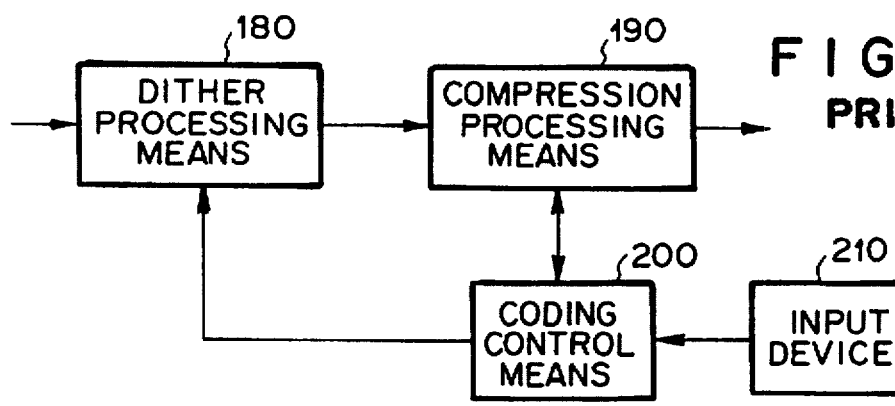
FIG. 15 is a block diagram showing the construction of a conventional simple moving picture data coding apparatus.
Figure 16:
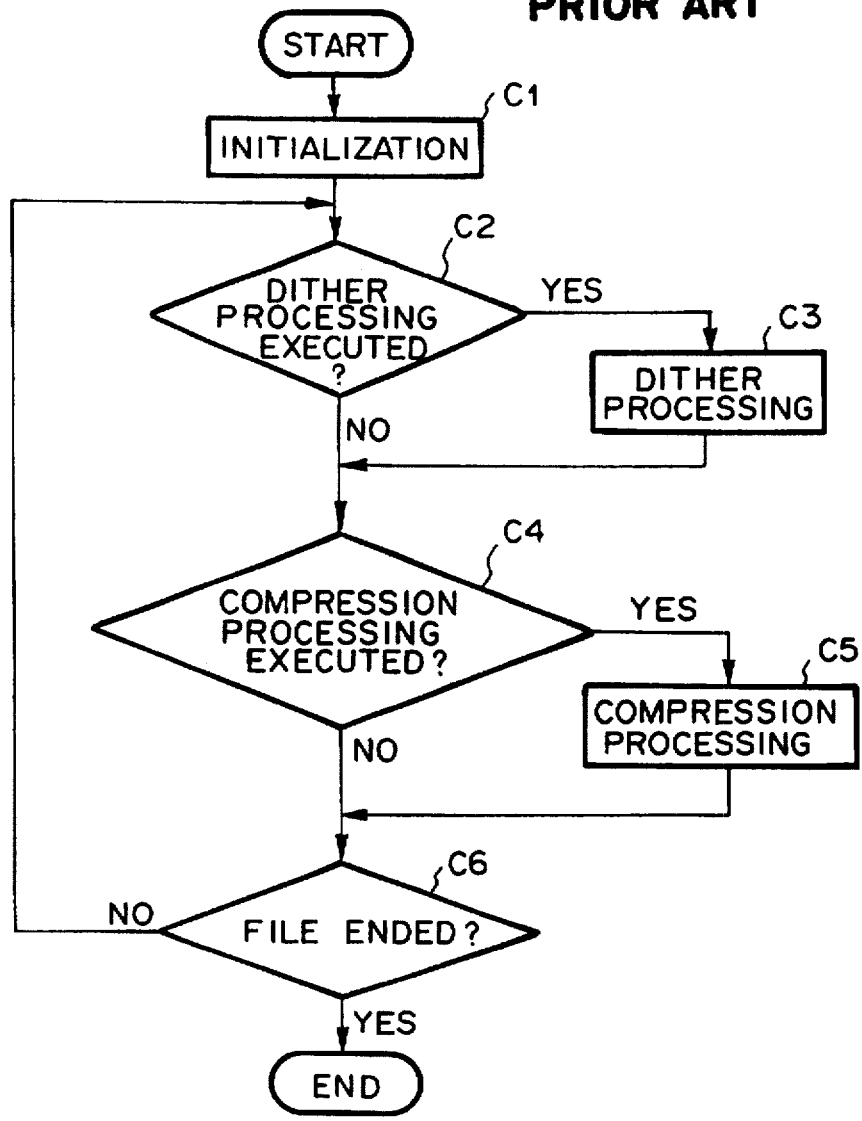
FIG. 16 is a flowchart showing the processing of the conventional simple moving picture data coding apparatus.

FIGS. 6 and 7 are flowcharts showing the operation of the step A2 for judging whether the input simple moving picture data can be compressed. In the coding judgment, each processing is performed on the simple moving picture data until the second frame as input data to compress the data, and then the coding amount after the compression is compared between these compressed data to determine the coding system.

The coding judgment of the step A2 will be described with reference to FIGS. 1, 6 and 7.

The data of the first frame are prepared (step A201), and the dither processing is performed in the dither processing means 10 (step A202). The dither-processed data of the first frame are stored in the previous frame data storage means 31 (step A203), and the data of the second frame are prepared (step A204).

The dither processing means 10 performs the dither processing on the data of the second frame (step A205), and the coding control means 60 obtains the byte number (A) of the data after the data of the second frame are subjected to the dither processing (step A206).

The coding control means 60 controls the data selection means 20 and the data selection means 40 to supply the dither-processed data to the compression processing means 50. The compression processing means 50 performs the compression processing on the supplied dither-processed data (step A207). The coding control means 60 obtains the byte number (B) of the data after the compression processing (step A208).

The inter-frame differential processing means 32 calculates the inter-frame difference between the dither-processed data of the first frame which are beforehand stored in the previous data storage means 31, and the dither-processed data of the second frame which are supplied from the data selection means 20, and then it outputs the calculation result (step A209).

The coding control means 60 controls the data selection means 40 to supply the compression processing means 50 with the data which are supplied from the inter-frame differential processing means 32. The compression processing means 50 performs the compression processing on the supplied data (step A210), and the coding control means 60 obtains the byte number (C) of the data after the compression processing (step A211).

In steps A212 and A213, the byte numbers of the three kinds of data thus obtained are compared with one another to determine the coding system and set the flag (steps A214, step A215).

In step A212, the byte number (B) (obtained in step A208) of the data after the data of the second frame are dither-processed and compressed, are compared with the byte number (C) (obtained in step A209) of the data after the data which are subjected to the dither processing and the inter-frame differential processing are compressed.

If the byte number (C) of the data which are subjected to the inter-frame differential processing is larger than the byte number (B) of the data which are not subjected to the inter-frame differential processing (C>B), the process goes to a next comparison step for the byte number of next data (step A213). This means that the inter-frame differential processing is not effective to the input simple moving picture data.

In step A213, the byte number (B) of the data obtained by compressing the dither-processed data is compared with the byte number (A) (obtained in step A206) of the data of the second frame after the dither processing. If the byte number (B) of the data obtained by compressing the dither-processed data is larger than the byte number (A) of the dither-processed data which are not compressed (B>A), it is judged that the dither processing is not effective to the input simple moving picture data, and the process goes to a step for identifying the coding system providing high compressibility through no dither processing.

If B>C in step A212, it is judged that a coding system for compressing the data which have been subjected to the dither processing and the inter-frame differential processing is most effective in compressibility and gradation, and all of the dither flag, the differential flag and the compression flag are set to "0" to perform all the processing (step A215). Subsequently, the process goes to step A3 of FIG. 5 as described above.

If A>B in step A213, it is judged that a coding system for dither-processing and compressing the data is most effective in compressibility and gradation, and the dither flag and the compression flag are set to "0" to perform the dither processing and the compression processing while the differential flag is set to "1" to perform no differential processing (step A214). Subsequently, the process goes to a step A3 of FIG. 5 as described above.

Next, the coding system when the dither processing is not effective to the input simple moving picture data will be described. If it is judged through the data amount comparison of step A213 that the dither processing is not effective, the data of the first frame are prepared again (step A216) and stored in the previous frame data storage means 31 (A217), and then the data of the second frame are prepared (step A218).

The coding control means 60 obtains the byte number (D) of the data of the second frame (step A219), and controls the data selection means 20 and the data selection means 40 to supply the compression processing means 50 with the original data (these data are hereinafter referred to as "original data" in order to discriminate from the dither-processed data in the following description). The compression processing means 50 performs the compression processing on the supplied original data (step A220), and the coding control means 60 obtains the byte number (E) of the data after the compression processing (step A221).

The inter-frame differential processing means 32 performs the inter-frame difference between the original data of the first frame stored previously in the previous frame data storage means 31 and the original data of the second frame supplied from the data selection means 20 (step A222).

The coding control means 60 controls the data selection means 40 to supply the compression processing means 50 with the data which are supplied from the inter-frame differential processing means 32. The compression processing means 50 performs the compression processing of the supplied data (step A223), and the coding control means 60 obtains the byte number (F) of the data after the compression processing (step A224).

In steps A225 and 226, the byte numbers of the three kinds of data which are obtained through the processing of the original data are compared with one another to determine the coding system and set the flags (step A227, step A228). The dither flag is set to "1" to perform no dither processing.

In step A225, the byte number (E) (obtained in step A221) of the data obtained by compressing the original data of the second frame is compared with the byte number (F) (calculated in step A224) of the data obtained by performing the inter-frame differential processing and the compression processing on the original data.

If the byte number (F) of the data which have been subjected to the inter-frame differential processing is larger than the byte number (E) which has subjected to no inter-frame differential processing (F>E), the process goes to a step to compare with the byte number of next data (step A226). This means that the inter-frame differential processing is not effective to the original data.

In step A226, the byte number (E) of the data obtained by compressing the original data is compared with the byte number (D) (obtained in step A219) of the original data of the second frame. If the byte number (E) of the compressed data is larger than the byte number (D) of the data which have not been compressed (E>D), it is judged that the compression processing is not effective to the input original data, and the coding system is finished (step A229). As shown in FIG. 5, in this case, the coding system is proceeded from step A2 to step A3, A5, A8, A10 and END ordinary.

If E>F in step A225, the coding system for performing the inter-frame differential processing and the compression processing on the original data is adopted, and thus the differential flag and the compression flag are set to "0" to perform the inter-frame differential processing and the compression processing (step A228).

If D>E in step A226, the coding system for performing only the compression processing on the original data is adopted, and thus the compression flag is set to "0" to perform the compression flag while the differential flag is set to "1" to perform no differential processing (step A227). In steps A227 and A228, the dither flag is set to "1" to perform no dither processing.

As described above, in the first embodiment, the judgment of the coding is made, and the coding system for the input simple moving picture data is determined. The first embodiment does not use the data which are obtained to determine the coding, but performs the coding from the first frame again. The second embodiment of the present invention uses the data which is obtained by executing the judgment of the coding.

The second embodiment according to the present invention will be described with reference to the accompanying drawings.

Figure 2:
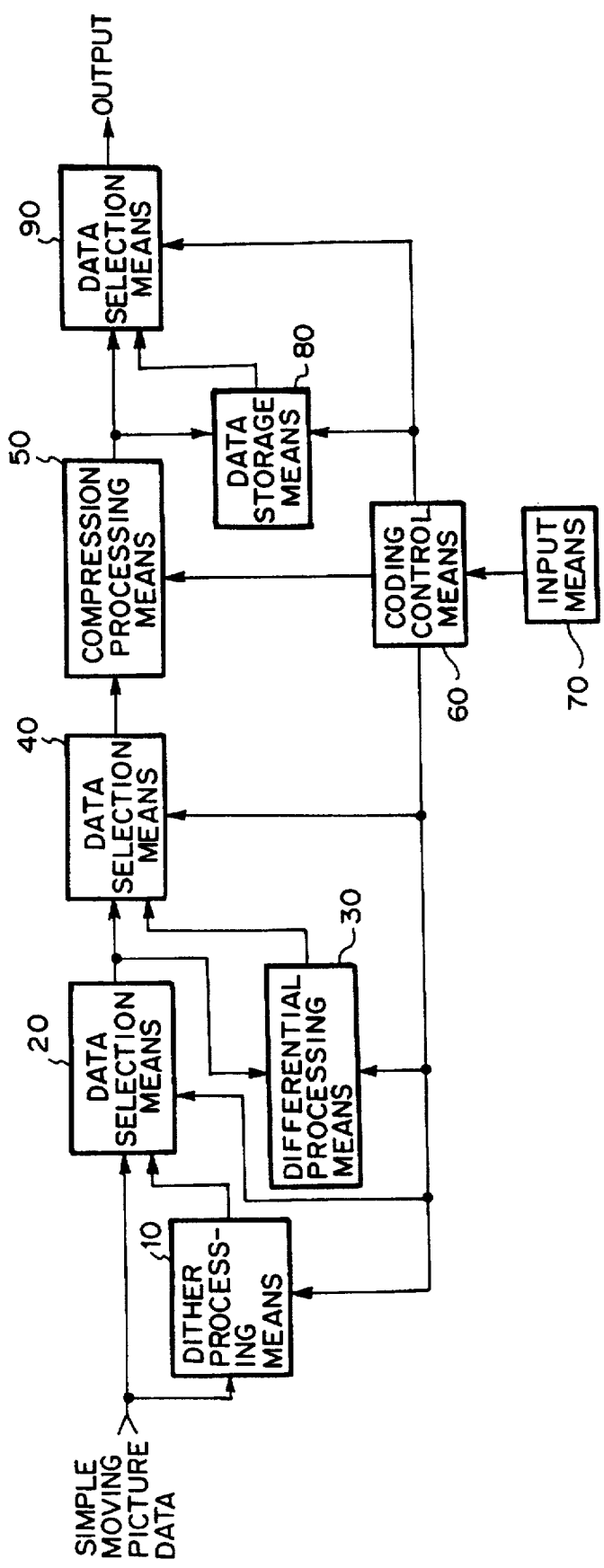
FIG. 2 is a block diagram showing the functional construction and the operation environment of a second embodiment of the present invention.

In the second embodiment, the simple moving picture data coding apparatus of the first embodiment shown in FIG. 1 is further provided with data storage means 80 and data selection means 90 as shown in FIG. 2. The processing content of the coding judgment processing is shown in FIGS. 8 to 11.

In step A201 to step A229, the same operation as shown in FIGS. 6 and 7 is performed, and thus the description thereof is omitted.

The data storage means 80 comprises first frame data storage means 81, second frame data storage means 82, second frame data storage means 83 and data selection means 84. The data selection means 90 receives the first frame data and outputs the first frame data to a memory media, for example, a DRAM, a FIFO, a VCR and so like, for storing.

The operation of the second embodiment according to the present invention will be described with reference to FIGS. 2, 8, 9, 10 and 11.

In step B202, the data of the first frame which have been dither-processed and then compressed (step B201) are stored in the data storage means 81. In step B203, the data of the second frame which have been dither-processed and then compressed are stored in the data storage means 82. In step B204, the data of the second frame which have been subjected to the dither-processing, the inter-frame differential processing and the compression processing are stored in the data storage means 83.

All instructions to store data in the data storage means 81 to 83 is made by the coding control means 60.

In step A212, if the byte number (C) of the data obtained by performing the dither processing, the inter-frame differential processing and the compression processing on the data of the second frame is smaller than the byte number (B) of the data obtained by performing the dither processing and the compression processing on the data of the second frame (B>C), the coding control means 60 instructs the output of the data of the first frame stored in the data storage means 81 (step B207), and then instructs the output of the data of the second frame which are stored in the data storage means 83. This instruction signal is supplied to the data selection means 84 to output the data corresponding to the instruction to the data selection means 90. The data selection means 90 selects and outputs the data supplied from the data storage means 80.

In step A213, if the byte number (B) of the data obtained by performing the dither processing and the compression processing on the data of the second frame is smaller than the byte number (A) of the data obtained by performing the dither processing on the data of the second frame (A>B), the coding control means 60 instructs the output of the data stored in the data storage means 81 (step B205), and then instructs the output of the data stored in the data storage means 82 (step B206). This instruction signal is supplied to the selection means 84 to output the data corresponding to the instruction to the data selection means 90. The data selection means 90 selects and outputs the data supplied from the data storage means 80.

In step B210, the data obtained by compressing the original data of the first frame are stored in the data storage means 81 (step B209). In step B211, the data obtained by compressing the original data of the second frame are stored in the data storage means 82. In step B212, the data obtained by performing the inter-frame differential processing and the compression processing on the original data of the second frame are stored in the data storage means 83.

In step A225, if the byte number (F) of the data obtained by performing the inter-frame differential processing and the compression processing on the original data of the second frame is smaller than the byte number (E) of the data obtained by performing the compression processing on the original data of the second frame (E>F), the coding control means 60 instructs the output of the data stored in the data storage means 81 (step B215), and then instructs the output of the data stored in the data storage means 83 (step B216). This instruction signal is supplied to the selection means 84 to output the data corresponding to the instruction to the data selection means 90. The data selection means 90 selects and outputs the data supplied from the data storage means 80.

In step A226, the byte number (E) of the data obtained by performing the compression processing on the original data of the second frame is smaller than the byte number (D) of the original data of the second frame (D>E), the coding control means 60 instructs the output of the data stored in the data storage means 81 (step B213), and then instructs the output of the data stored in the data storage means 82 (step B214). This instruction signal is supplied to the selection means 84 to output the data corresponding to the instruction to the data selection means 90. The data selection means 90 selects and outputs the data supplied from the data storage means 80.

As described above, according to the simple moving picture data coding apparatus of the present invention, the first effect is that the optimum coding system can be selected. This is because the data which have been beforehand subjected to each processing through the coding judgment are compressed and then the coding amount is compared to determine the coding system.

The second effect is that the compressibility of the simple moving picture data can be enhanced. This is because the inter-frame differential processing using the inter-frame data are performed.

The third effect is that the coding can be efficiently performed. This is because a work for compressing the dither-processed data which are not expected to be compressed and then checking the coding amount is beforehand performed by the coding judgment.

While this invention has been particularly shown and described with reference to the preferred embodiments thereof, this description is not intended to be construed in a limiting sense. Various modifications and combinations of the preferred embodiments, as well as other embodiments of the invention, will be apparent to persons skilled in the art upon reference to the description. It is therefore intended that the appended claims encompass any such modifications or embodiments.

What is claimed is:

1. A moving picture coding apparatus for coding simple moving picture data having plural multivalued image data, comprising:

dither processing means for performing dither processing on the simple moving picture data;

differential processing means for performing inter-frame differential processing on dither-processed data of a current frame with dither-processed data of a previous frame; and compression processing means for compressing the data obtained by said differential processing means.

2. The moving picture coding apparatus as claimed in claim 1, wherein said dither processing, said differential processing and said compression processing are performed for coding the simple moving picture data in accordance with a flag.

3. The moving picture coding apparatus as claimed in claim 2, further including coding control means for determining said flag before the coding.

4. The moving picture coding apparatus as claimed in claim 3, further including data storage means for storing and selectively outputting data compressed by said compression processing means.

5. A moving picture coding apparatus comprising:

dither processing means for performing dither processing on simple moving picture data comprising plural multivalued image data;

first data selection means for selecting from input simple moving picture data and data supplied from said dither processing means and outputting first selected data;

differential processing means for performing differential processing on the first selected data; and second data selection means for selecting from the first selected data and data supplied from the differential processing means and outputting second selected data;

compression processing means for compressing the second selected data;

input means for inputting an instruction of a coding processing condition; and coding control means for controlling said dither processing means, said differential processing means, said compression processing means, and said first and second selection means in accordance with the instruction of the coding processing condition.

6. The moving picture coding apparatus as claimed in claim 5, further comprising data storage means for storing an output of said compression processing means over plural frames and selectively outputting the stored data, and third data selection means for selectively outputting the output of said compression processing means and an output of said data storage means, wherein said coding control means controls said data storage means and said third data selection means.

7. A method for coding moving picture data, comprising the steps of:

dither processing the moving picture data over two frames;

differential processing dither-processed data of the two frames; and compressing the data obtained by said differential processing.

8. The method as claimed in claim 7, wherein the step of differential processing includes the step of performing an exclusive OR operation on the dither-processed data of the two frames.

9. The method as claimed in claim 7, further comprising the step of storing and selectively outputting the data obtained by said compressing.

10. The method as claimed in claim 7, further comprising the steps of:

dither processing first and second frames of the moving picture data;

differential processing dither-processed data of the first and second frames;

compressing the data obtained by said differential processing of the first and second frames;

setting a coding condition flag based on results obtained from said dither processing, said differential processing, and said compressing of the first and second frames of moving picture data; and controlling said dither processing, said differential processing, and said compressing of subsequent frames based on said coding condition flag.

* * * * *